April 14, 1970   N. A. WILLIAMS ET AL   3,505,713
METHOD AND APPARATUS FOR CONTROLLING MOVING MATERIAL
Filed May 8, 1967   2 Sheets-Sheet 1

INVENTORS
NEWELL A. WILLIAMS
ROBERT C. JENKINS
BY Bosworth, Sessions, Herrstrom & Knowles
ATTORNEYS INVENTORS
NEWELL A. WILLIAMS
BY ROBERT C. JENKINS
*Bosworth, Sessions,*
*Herrstrom & Knowles*
ATTORNEYS

United States Patent Office 3,505,713
Patented Apr. 14, 1970

3,505,713
METHOD AND APPARATUS FOR CONTROLLING MOVING MATERIAL
Newell A. Williams and Robert C. Jenkins, Cuyahoga Falls, Ohio, assignors to The Goodyear Tire & Rubber Company, Akron, Ohio, a corporation of Ohio
Filed May 8, 1967, Ser. No. 636,990
Int. Cl. D02j 13/00
U.S. Cl. 28—62                                    12 Claims

ABSTRACT OF THE DISCLOSURE

A sampling type control system for use in connection with apparatus for treating a continuous strand or strip of material such as tire cord fabric being translated through a treating station. The system monitors a physical characteristic of the strand or strip that is affected by the treatment and compares it at spaced time intervals with a fixed reference. The differential if any is then analyzed as to its sign and magnitude and used to adjust the treating conditions to bring the physical characteristic back to the condition established by the reference. The sampling is then repeated after one or more treatment intervals have elapsed.

BACKGROUND OF THE INVENTION

The invention is generally concerned with a method and apparatus for processing or treating a continuous moving strand or strip. More particularly, the invention relates to the control of one or more parameters of a treating unit which affect a physical characteristic of the strand or strip as it is translated therethrough during the treating process.

For the purpose of this description, "strands" is to be understood to include yarns, cords or monofilaments such as nylon, rayon, and glass fiber and "strips" is to be understood to include strands and also webs such as tire cord fabric.

In many present-day continuous or semi-continuous strip-treating applications, it is desirable to maintain a high degree of uniformity of result throughout the treatment of the strand or strip. In many instances deviations from the desired uniformity can be detected by variations in certain readily measured physical characteristics in the portion of the strip or strand being treated.

Of particular relevance is the processing of continuous webs of textile cords such as those used in forming the plys of pneumatic tires. Fabric webs of this type ordinarily are composed of longitudinal cords of textile fibers such as nylon, rayon, polyester or glass and are subjected to tension during processing.

In processing webs of tire cord fabric, by way of example, the web is first coated with a suitable adhesive and then dried and heated while under tension (hot stretched) to impart the desired physical properties to the cords, especially to minimize the extensibility of the cords under the conditions the cords will encounter during the tire building and vulcanizing operations and when the tires are subsequently placed in service. During the drying and hot stretching operation, the cords are passed through treating ovens at a carefully controlled temperature under the tension that is required to stretch them to the desired amount.

Since the temperature within the heat-treating ovens is carefully maintained at a fixed level usually occurring, for example, between 360° and 560° F., the time of exposure of the web being treated is the most readily controlled parameter affecting the treatment. Since exposure time, however, is a function of the speed of translation of the web and the length of the web within the treating chamber, the exposure time cannot be held constant unless these two factors are carefully coordinated.

Another factor of vital importance during the heat-treating is the tension in the web. This may be regulated, for example, through control of the amount of stretch by maintaining a constant speed differential between holdback rolls and pull rolls located at the input and output ends respectively, of the heat-treating oven. Tension may also be sensed by means of load cells which measure the force produced by the web on an idler roll. This force is converted into an electrical signal which is used to control the speed of the pull rolls.

As to the control of exposure time, many means are used such as, for example, a web positioning mechanism for adjusting the length of the web increment passing through the oven.

Briefly, one type of web positioning mechanism for controlling exposure time comprises one or more web-carrying dancer rolls within an oven chamber, each dancer roll being connected by a cable, chain or other means to web-carrying dancer rolls located outside of the oven chamber. Accordingly, movement of the oven dancer rolls in one direction results in compensating movement of the outside dancer rolls in the opposite direction. The oven dancer rolls generally move between a position providing maximum exposure for the web and a position providing no exposure wherein the rolls are located outside of exit openings formed in the oven. By varying the position of the oven dancer rolls in response to changes in the speed of the translation of the web, the exposure time within the oven can be held substantially constant.

Where a plurality of oven dancer rolls are used to provide multiple passes of the web into and out of the oven, certain non-linear factors are introduced into the constant exposure treatment. As the web must emerge from the oven between passes to pass over fixed idler rolls below the oven, there are intermittent periods of cooling during the "constant exposure" pass through the oven. Accordingly, when the web is translating at a relatively slow speed the intermittent cooling periods are longer than when the web is translating at a relatively high speed. While some rough compensation for this factor can be provided for by the web positioning mechanism control, the provision for complete control through mathematical formulation is extremely complex and no satisfactory control means is currently available.

Treatment transients which result from the above factors are reflected primarily in variations in two web conditions—namely the web exit temperature and the web tension between the pull rolls and the holdback rolls. Of these two conditions, tension appears to be the best indicator of transient variations in web treatment. While the amount of stretch, say 10%, for example, is held constant, the tension at a fixed stretch can vary due to variations in the heat treatment. For example, certain types of cords become more plastic at high temperatures and this reduces the tension depending on the temperature to which the cords are raised. In the prior art it has been found that the tension varies significantly between low web speed and high web speed even though exposure time is held constant.

The present invention provides a means for compensating for transient variations in treating conditions and provides other advantages not obtainable from the prior art.

SUMMARY OF THE INVENTION

It is among the objects of the invention to control the uniformity of treatment of a moving strand or strip.

Another object is to provide a sampling-type control system for apparatus for treating a continuous moving strand or strip so as to adjust the treating conditions in response to transient variations thereof which affect certain physical characteristics of the strip and thus maintain uniform treatment throughout the length of the strip.

A further object is to control the heat treatment of a moving tensioned web of tire cord fabric during transient variations in the speed of translation thereof by sampling the tension of the web at spaced time intervals and adjusting the treating conditions to maintain a uniform tension.

These and other objects of the invention are realized through the provision of a sampling type control system for controlling the treating conditions in a treating unit through which a continuous strip is translated, the system including the following elements:

Means for detecting a variation in a physical characteristic of the moving strip, Means for determining the sign of the variation, Means for determining the magnitude of the variation, and Means for adjusting the treating condition in the unit at spaced time intervals in response to the sign and magnitude of the variation.

According to one embodiment of the invention, the tension of the moving strip is detected by a load cell operatively connected to an idler roll over which the strip or strand passes. The load cell converts the tension into a voltage signal which in turn is used to adjust a slide wire potentiometer. A voltage across the potentiometer is then compared with a reference voltage across another manually-adjustable potentiometer to detect any error voltage which would reflect both the sign and magnitude of the tension variation. This error voltage is then used at spaced time intervals to adjust the treating conditions in a treating chamber to compensate for the transient conditions which resulted in the tension variation.

The strip processing method of the invention comprises the steps of:

Measuring a physical characteristic of a continuous strip while the strip is being translated through a treating unit which affects the physical characteristic, Comparing the measurement with a fixed reference to detect a variation, Determining the sign and magnitude of the variation at spaced time intervals, and Adjusting the treatment in response to the sign and magnitude of the variation.

BRIEF DESCRIPTION OF THE DRAWINGS

FIGURE 1 also shows schematically a sampling type tension control system for the web positioning mechanism in accordance with the invention.

DESCRIPTION OF THE PREFERRED EMBODIMENT

Figure 1:
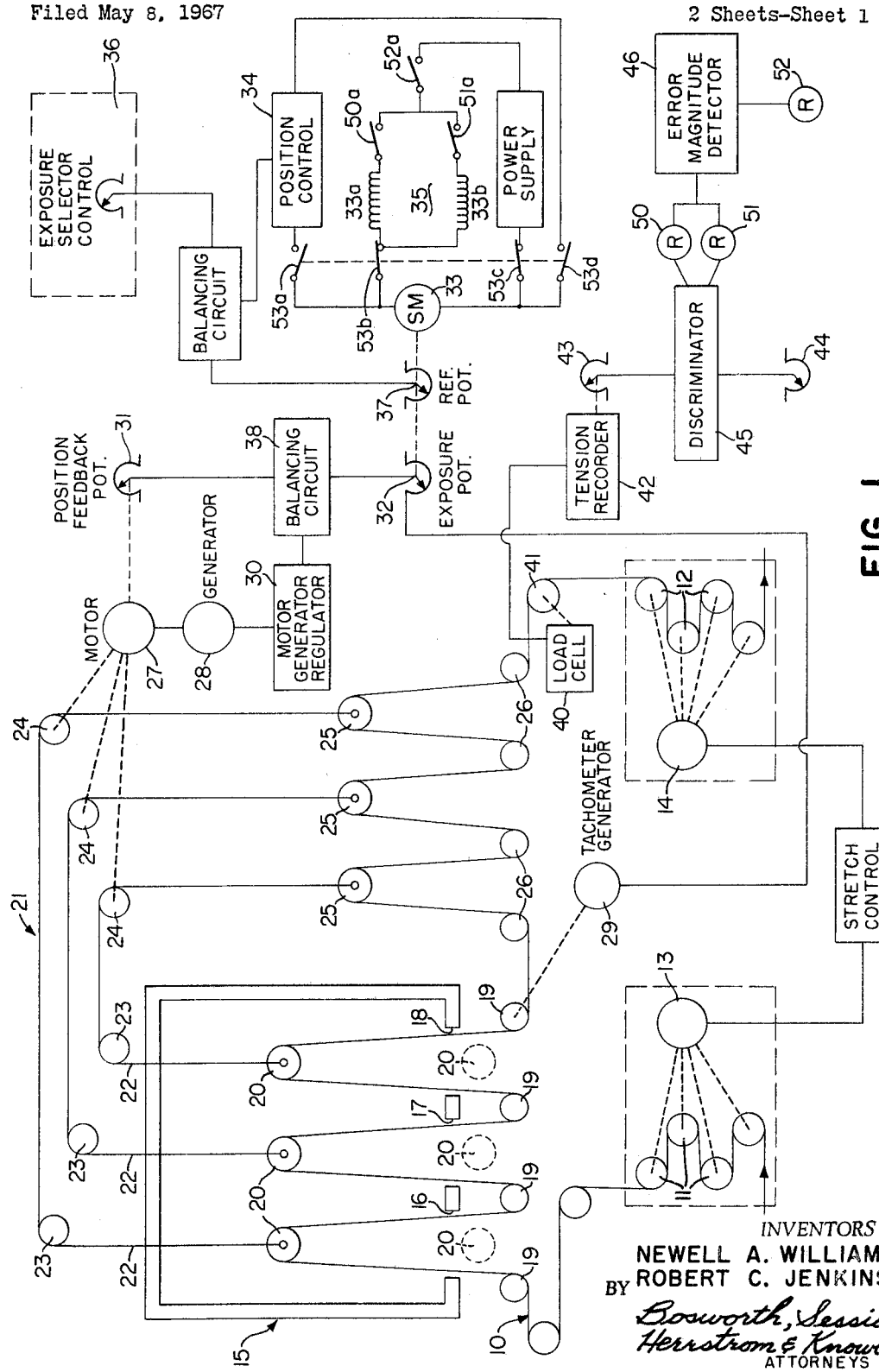
FIGURE 1 is a schematic diagram showing the heat-treating portion of a processing line for a continuous web of tire cord fabric and illustrating a mechanism for adjusting the exposure time of the web in the heat treating oven.

Referring more particularly to the drawings, FIGURE 1 shows a continuous fabric web 10 formed of longitudinal textile cords being tension between an assembly 11 of hold back rolls and an assembly 12 of pull rolls. The holdback rolls 11 are controlled by a dynamoelectric machine 13 while the pull rolls 12 are controlled by another dynamoelectric machine 14, the dynamoelectric machines being operated to provide a constant stretch. Between the holdback rolls 11 and pull rolls 12, the fabric web 10 is passed through a heat-treating oven 15. The web 10 passes into and out of the oven 15 a total of three times and three separate openings 16, 17 and 18 are provided to permit entry and exit between passes. The web 10 is guided below the oven by means of idler rolls 19 and within the oven by means of dancer rolls 20 forming a part of a web positioning mechanism broadly indicated by the numeral 21. The dancer rolls 20 are connected by chains 22 which pass over sprockets 23 and 24 to another set of dancer rolls 25 located outside of the oven 15. The web 10 passes back and forth between the dancer rolls 25 and idler rolls 26 located below. The sprockets 24 are operatively connected to one another and are driven by a motor 27, the motor 27 being powered by a generator 28.

It will be seen that when the motor 27 is operated to turn the sprockets 24 and change the position of the dancer rolls 20 within the oven 15, the dancer rolls 25 will move in an opposite direction to compensate for the change in the length of the web 10 within the oven 15 to maintain a substantially constant length of the web 10 between the holdback rolls 11 and the pull rolls 12. The dancer rolls 20 are movable between a position providing maximum exposure wherein the rolls 20 are located near the top of the oven 15, and a position indicated in dashed lines wherein the dancer rolls 20 are located entirely outside of the oven.

A tachometer generator 29 is connected to one of the idler rolls 19 and the voltage produced thereby is modulated by the exposure potentiometer 32. The resultant voltage signal is fed as a reference to a motor generator regulator 30. Thus a change in either the speed of translation of the web or the exposure setting will result in a change in the reference signal value.

A position feed back potentiometer 31 which is operated in response to movement of the dancer rolls 20 provides a voltage signal which is balanced against the voltage reference signal in the balancing circuit 38. The resultant error signal is amplified by the regulator 30 and controls the operation of the motor 27 through generator 28.

When the system is operating in the position control mode, which applies well-known control techniques and forms no part of this invention, an exposure selector control potentiometer 36, adjusted by an operator, produces a voltage which is balanced against a voltage from a feed back potentiometer 37. The resultant voltage signal operates a servo motor 33 that positions the exposure potentiometer 32, which is ganged to the feed back potentiometer 37.

Accordingly, any change an operator makes with the exposure selector control potentiometer 36 will produce a corresponding change in the setting of exposure potentiometer 32.

It can be seen that either a change in the speed of translation of the web, or a change in the position of the exposure potentiometer 32, will cause a change in the voltage signal to the balancing circuit 38, which results in a voltage signal to the regulator 30. This causes the motor 27 to run in the proper direction for moving the position feed back potentiometer 31 to balance out the reference signal in the balancing circuit 38. This in turn moves the dancer rolls to a new position in the oven. By selection of the proper circuit parameters, a change in speed of translation of the web will cause the dancer rolls to move to a new position, so that the time the web is in the oven 15 will not change. This results in constant exposure of the web.

As indicated in the "Background of the Invention" above, the effects of the heat-treating on the web 10 do not always remain the same after a change in the speed of translation of the web even though the exposure time is held constant. It is believed that this lack of uniformity of treatment is due in part to the variable cooling of the web as it passes out of the oven and around the idler rolls 19 between passes.

Also, as presented above, the tension of the web 10 under a constant stretch as provided by the roll assemblies 11 and 12, provides a fairly reliable indicator as to the heat-treatment of the web and variations which occur in the treatment.

In order to monitor the tension of the web 10 between the roll assemblies 11 and 12 during the treating process, a load cell 40 is provided for use in connection with an idler roll 41. For the purpose of illustration, the load cell used is a highly sensitive strain gauge. The load cell 40 converts the tension in the web into a voltage signal which is transmitted to a tension recorder 42. The tension recorder 42 is mechanically coupled to a retransmission slide wire type potentiometer 43 and a voltage across the potentiometer 43 is balanced against a voltage from a tension-setting potentiometer 44. Accordingly, any variation in tension in the web will be detected in the form of an error voltage which, as will be described below, is used to adjust the oven dancer roll position to compensate for the transient treating condition which caused the tension variation.

As shown in FIGURE 1, the sign of the error voltage is detected by a discriminator 45 while the magnitude of the error voltage is determined by an error magnitude detector 46. Because the results of an adjustment in the position of the web within the oven will not be fully determined until a full exposure time has passed, a sampling technique is used to analyze the error voltage only at spaced time intervals. The time interval preferably corresponds to the exposure time of a web length increment. Accordingly, a cycle timer 47 (FIGURE 2) is used to energize a cycle timer relay 48 which closes switch contacts 48a connected between the error voltage source and the error magnitude detector 46. The cycle timer 47 may be any one of many suitable mechanical timers currently available. Also the timer 47 is preferably adjustable to provide for example, time intervals of 30, 60, 90 and 120 seconds.

The discriminator 45 which detects the sign of the error voltage operates either an increase relay 50 or a decrease relay 51 which in turn close relay contacts 50a or 51a respectively located in the tension control mode circuit 35.

After the cycle timer relay contacts 48a have closed for an error magnitude measuring interval, an error magnitude relay 52 located in the error magnitude detector circuit closes contacts 52a in the tension control mode circuit 35. The period of time in which the contacts 52a are closed will correspond to the magnitude of the error voltage and when the control mode selector switch contacts 53b are closed, an energizing circuit will be complete to the control motor 33. Thus the control motor 33 will be operated for a time interval corresponding to the magnitude of the error voltage. The direction in which the motor 33 will turn the exposure potentiometer 32 will depend upon which field coil winding 33a or 33b, are energized during its operation. The two sets of coil windings 33a and 33b are adapted to operate the control motor in opposite directions and one or the other is energized depending upon whether the increase relay contacts 50a or decrease relay contacts 51a are closed.

Figure 2:
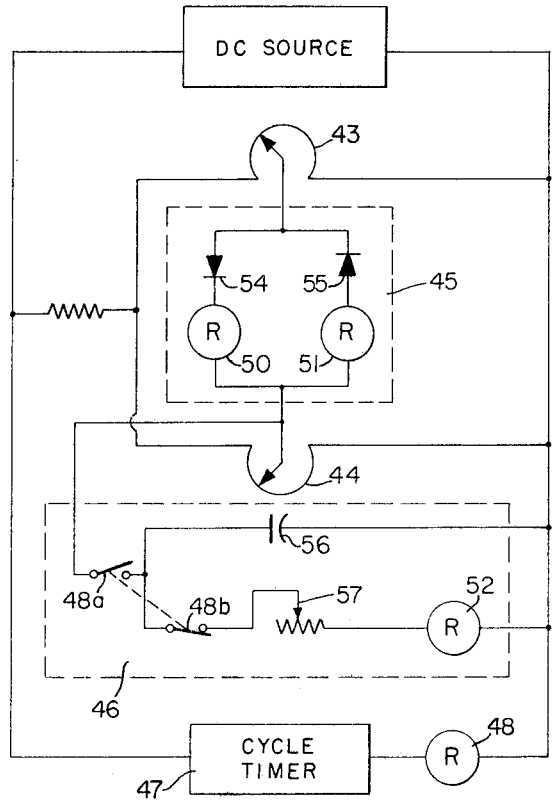
FIGURE 2 is a schematic diagram of the electrical control circuitry for use in controlling the web positioning mechanism in response to a transient variation in web tension.
Figure 2:
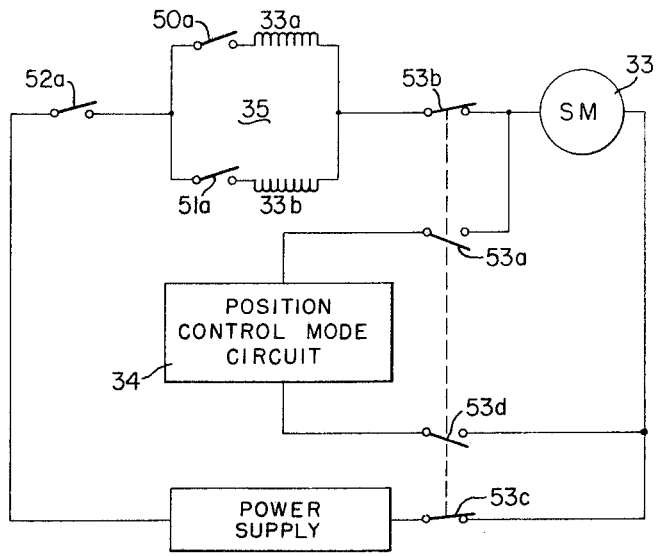

FIGURE 2 presents in greater detail the circuits for the discriminator 45, the error magnitude detector 46, and the motor control circuit 35. The discriminator 45 uses diodes 54 and 55 located in branch circuits including the relays 50 and 51, the diodes 54 and 55 being oriented in reverse manner to permit an error voltage to flow through only one branch depending on its sign.

The error magnitude detector 46 includes a charging capacitor 56 which is charged whenever cycle timer relay contacts 48a are closed. Closing the contacts 48a causes the contacts 48b to open so that current will not flow as yet through the error magnitude relay 52. After the cycle timer 47 times out the cycle timer relay 48 is deenergized and the relay contacts 48a open. At the same time contacts 48b close so that the charge on the capacitor 56 is dissipated through the rheostat 57 and the windings of the error magnitude relay 52. It will be seen that the period during which the windings of the error magnitude relay 52 are energized will be dependent upon the charge of the capacitor 56. The charge will of course be dependent on the magnitude of the error voltage which was applied. Accordingly the error magnitude relay contacts 52a will remain closed for a period of time corresponding to the magnitude of the error voltage.

OPERATION

In the operation of the web positioning mechanism and its control system with the control mode selector switch contacts 53 switched to the tension control mode, the load load cell 40 operatively connected to the idler roll 41 continuously monitors the tension of the web 10. The voltage signal from the load cell 40 is transmitted to the tension recorder 42 which by mechanical means operates the slide wire potentiometer 43. A voltage across the potentiometer 43 is then balanced against a voltage across the tension-setting potentiometer 44.

For the purpose of illustration it will be assumed that due to a transient condition (such as a web speed change) in the treatment of the web 10 within the oven 15, an increase in tension occurs. This will cause the voltage across the potentiometer 43 to be greater than the voltage across the potentiometer 44. Thus the balancing of these voltages will result in an error voltage appearing across the branch of the discriminator circuit 45 which includes the increase relay 50. This error voltage will then close switch contacts 50a in the tension control mode circuit 35.

After a selected time interval the cycle timer 47 will energize the cycle timer relay 48 which in turn will close contacts 48a of the error magnitude detector 46. As the contacts 48a close, contacts 48b open to open the circuit across the error magnitude relay 52.

With the switch contacts 48a closed the error voltage from the discriminator 45 will be picked up and applied to the charging capacitor 56.

After the cycle timer 47 times out the cycle timer relay 48 is deenergized and the cycle timer relay contacts 48a open while at the same time contacts 48b close.

The charge on the capacitor 56 will be proportional to the error voltage which was applied during the cycle timer interval. This charge will now be dissipated across the rheostat 57 and will energize the error magnitude relay 52 until the charge has dissipated.

The error magnitude relay 52 closes switch contacts 52a which completes the circuit through the control motor field windings 33a. These field windings 33a will be energized as long as the error magnitude relay 52 is energized and the motor 33 will operate to turn the exposure setting potentiometer in a direction tending to increase the web exposure time by raising the dancer rolls 20 in the oven. The voltage across the exposure setting potentiometer 32 will be applied to the balancing circuit 38 and the difference between this voltage and the feedback voltage from the position feedback potentiometer 31 will be applied to the regulator 30 which causes generator 28 to operate the motor 27. The change in the position of the web positioning mechanism will cause an adjustment of the position feedback potentiometer 31. This adjustment should continue until the voltage across the potentiometers 31 and 32 are balanced after which the regulator 30 will stop the motor 27.

The operation of the system to correct for a decrease in tension will be substantially the same, the only difference being that the sign of the error voltage will be different and the decrease relay 51 will be energized rather than the increase relay 50 so that switch contacts 51a will be closed to energize the opposite field windings 33b of the control motor 33.

While the invention has been shown and described with reference to the control of a web positioning mechanism, it has application to many other types of treatment control apparatus and may be used for the processing of many different types of webs, strands, strips etc. Also it will be apparent that other types of control circuitry may be used to accomplish the various control functions of the invention including other discriminator circuits well-known to those skilled in the art as well as other error magnitude detectors and other motor control circuits.

Although only one embodiment of the invention is illustrated and described it will be understood that variations and modifications may be made in the form and arrangement thereof without departing from the spirit of the invention. The invention therefore is not to be limited to the particular mechanisms and circuits herein shown and described nor in any other manner inconsistent with the degree to which the progress in the art has been promoted by this invention.

What is claimed is:

1. In a method including translating a continuous strip through a treating unit having a significant length of said strip therewithin at any instant of time, the steps of:
    measuring a physical characteristic of said strip which characteristic is subject to change within said treating unit,
    comparing the measurement obtained with a reference to detect a variation therebetween,
    determining the sign and magnitude of said variation at spaced time intervals, and
    adjusting said treating unit in response to said sign and magnitude of said variation to reduce said variation.

2. A method as defined in claim 1 wherein said physical characteristic is measured as said strip exits said treating unit.

3. A method as defined in claim 2 wherein said time intervals correspond to the time that each length increment of said strip is exposed to treatment while being translated through said unit.

4. A method as defined in claim 1 wherein said measurement is converted into a mechanical function which operates a potentiometer, and wherein a voltage across said potentiometer is compared with a reference voltage to detect an error voltage having a sign and magnitude corresponding to a variation in said measurement.

5. In a processing method including translating a continuous strip under tension through a heat-treating oven wherein the heat-treatment is subject to transient changes which vary the tension of the strip, the steps of:
    measuring the tension of said strip after said strip is translated through said heat-treating oven,
    converting said measured tension into a mechanical function,
    operating a potentiometer by means of said mechanical function,
    comparing a voltage across said potentiometer with a tension reference voltage to detect an error voltage corresponding to said tension variation,
    determining the sign and magnitude of said error voltage at spaced time intervals, and
    adjusting said heat-treatment in response to said sign and magnitude of said error voltage to reduce said tension variation.

6. In a process for heat-treating a web of tire cord fabric formed of continuous textile cords, including translating the web under tension through a heat-treating oven while providing a controlled exposure time for the web during transient changes in the speed of translation thereof, the steps of:
    measuring the tension of said cords while said web is translated through said oven,
    comparing said measured tension with a pre-set reference tension to detect a tension variation,
    determining the sign and magnitude of said tension variation at spaced time intervals, and
    adjusting said exposure time in response to said sign and magnitude of said tension variation.

7. In a process for heat-treating a web of tire cord fabric formed of continuous textile cords, including translating the web under tension through a heat-treating oven while providing a controlled exposure time for the web during transient changes in the speed of translation thereof, the steps of:
    measuring the tension of said cords while said web is translated through said heat treating oven,
    converting said measured tension into a mechanical function,
    operating a potentiometer by means of said mechanical function,
    comparing a voltage across said potentiometer with a pre-set tension reference voltage to detect an error voltage corresopnding to said tension variation, determining the sign and magnitude of said error voltage at spaced time intervals corresponding substantially to said exposure time, and
    adjusting said exposure time in response to said sign and magnitude of said tension variation.

8. In an apparatus for processing a continuous strip by translating the strip through a treating unit adapted to have a significant length of said strip therewithin at any instant of time, the improvement which comprises:
    means for measuring a physical characteristic of said strip, which characteristic is subject to change within said treating unit,
    means for comparing the measurement obtained with a reference to detect a variation therebetween,
    means including timing means for determining the sign and magnitude of said variation at spaced time intervals, and
    means for adjusting said treating unit in response to said sign and magnitude of said variation to reduce said variation.

9. Apparatus as defined in claim 8 wherein said means for comparing said measurement with a fixed reference comprises:
    means for converting said measurement into a mechanical function,
    a potentiometer operable by said mechanical function, and
    a balancing circuit for balancing a voltage across said potentiometer against a reference voltage to detect an error voltage.

10. Apparatus as defined in claim 9 wherein said means for determining the sign and magnitude of said variation at spaced time intervals comprises:
    a discriminator circuit including in parallel, two error voltage branches, each branch having an unidirectional device whereby a positive error voltage flows only in one branch and a negative error voltage flows only in the other branch,
    an error voltage magnitude detector circuit including a charging capacitor and a capacitor discharge circuit energized when said capacitor is discharging, and
    a timing circuit for applying said error voltage to said error voltage magnitude detector circuit at spaced time intervals.

11. In an apparatus for heat-treating a web of tire cord fabric formed of continuous textile cords, by translating the web under tension through a heat-treating oven and providing a controlled exposure time for the web during transient changes in the speed of translation thereof, the improvement which comprises:
    means for measuring the tension of said cords while said web is translated through said oven,
    means for comparing said measured tension with a preset reference tension to detect a tension variation,
    means for determining the sign and magnitude of said tension variation at spaced time intervals, and
    means for adjusting said exposure time in response to said sign and magnitude of said tension variation.

12. In an apparatus for heat-treating a web of tire cord fabric formed of continuous textile cords, by translating the web under tension through a heat-treating oven and providing a controlled exposure time for the web during transient changes in the speed of translation thereof, the improvement which comprises:

means for measuring the tension of said cords while said web is translated through said oven, means for converting said measured tension into a mechanical function, a potentiometer operable by said mechanical function, a balancing circuit for balancing a voltage across said potentiometer against a reference voltage to detect an error voltage, a discriminator circuit for determining the sign of said error voltage, including in parallel, two error voltage branches, each branch having a unidirectional device whereby a positive error voltage flows only in one branch and a negative error voltage flows only in the other branch, an error voltage magnitude detector circuit including a charging capacitor and a capacitor discharge circuit energized when said capacitor is discharging, a timing circuit for applying said error voltage to said error voltage magnitude detector circuit at spaced time intervals, and means for adusting said exposure time in response to said sign and magnitude of said error voltage.

References Cited

UNITED STATES PATENTS

| | | | |
|---|---|---|---|
| 2,617,007 | 11/1952 | Atkins | 219—20 |
| 2,930,102 | 3/1960 | Hitchin et al. | 28—59.5 |

LOUIS K. RIMRODT, Primary Examiner

U.S. Cl. X.R.

28—64, 71.3, 72